United States Patent
Stout

(10) Patent No.: US 9,274,673 B2
(45) Date of Patent: Mar. 1, 2016

(54) METHODS, SYSTEMS, AND MEDIA FOR REWINDING MEDIA CONTENT BASED ON DETECTED AUDIO EVENTS

(71) Applicant: Google Inc., Mountain View, CA (US)

(72) Inventor: James Stout, Mountain View, CA (US)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 14/145,057

(22) Filed: Dec. 31, 2013

(65) Prior Publication Data
US 2015/0185964 A1    Jul. 2, 2015

(51) Int. Cl.
| | |
|---|---|
| G06F 3/0481 | (2013.01) |
| H04N 5/44 | (2011.01) |
| H04N 5/445 | (2011.01) |
| H04N 21/2387 | (2011.01) |
| H04N 21/422 | (2011.01) |
| H04N 21/432 | (2011.01) |
| H04N 21/439 | (2011.01) |
| H04N 21/472 | (2011.01) |
| H04N 21/488 | (2011.01) |
| H04N 21/6587 | (2011.01) |

(52) U.S. Cl.
CPC ............ G06F 3/0481 (2013.01); H04N 5/4403 (2013.01); H04N 5/44513 (2013.01); H04N 21/2387 (2013.01); H04N 21/42203 (2013.01); H04N 21/4325 (2013.01); H04N 21/4394 (2013.01); H04N 21/47202 (2013.01); H04N 21/47217 (2013.01); H04N 21/4882 (2013.01); H04N 21/6587 (2013.01)

(58) Field of Classification Search
CPC .................................................... G06F 3/0481
USPC ....................................................... 715/716
See application file for complete search history.

(56) References Cited

U.S. PATENT DOCUMENTS

| | | | | |
|---|---|---|---|---|
| 5,371,551 A | * | 12/1994 | Logan | ...................... H04N 5/44 348/571 |
| 6,496,205 B1 | | 12/2002 | White et al. | |
| 6,529,586 B1 | * | 3/2003 | Elvins | ................. H04L 65/4007 379/88.13 |
| 7,293,279 B1 | * | 11/2007 | Asmussen | ............ H04N 5/4401 348/E5.099 |

(Continued)

FOREIGN PATENT DOCUMENTS

EP    1843591    10/2007

OTHER PUBLICATIONS

International Search Report dated Mar. 25, 2015 in International Patent Application No. PCT/US2014/072265.

(Continued)

*Primary Examiner* — Reza Nabi
(74) *Attorney, Agent, or Firm* — Byrne Poh LLP

(57) ABSTRACT

Methods, systems, and media for rewinding media content based on detected audio events are provided. In some embodiments, a method for providing media guidance is provided, the method comprising: causing media content to be presented; receiving, using an audio input device, audio data that includes ambient sounds in an environment in which the media content is being presented; receiving a user command to rewind the media content; detecting that a portion of the audio data corresponds to an audio event that occurred during the presentation of the media content in response to receiving the user command to rewind the media content; determining a playback position in the media content based on the audio event; and causing the media content to be presented from the determined playback position.

15 Claims, 4 Drawing Sheets

(56) References Cited

U.S. PATENT DOCUMENTS

| | | | |
|---|---|---|---|
| 8,244,105 B2* | 8/2012 | Verna | H04N 5/781 386/278 |
| 9,055,271 B2* | 6/2015 | Verna | H04N 5/781 |
| 2003/0035550 A1* | 2/2003 | Kimura | H04M 9/082 381/66 |
| 2003/0041332 A1* | 2/2003 | Allen | H04N 5/76 725/106 |
| 2005/0166258 A1* | 7/2005 | Vasilevsky | G11B 27/00 725/138 |
| 2007/0106941 A1* | 5/2007 | Chen | H04N 7/17318 715/728 |
| 2007/0143820 A1* | 6/2007 | Pawlowski | G11B 27/034 725/145 |
| 2007/0189544 A1* | 8/2007 | Rosenberg | H03G 3/32 381/57 |
| 2009/0135022 A1* | 5/2009 | Hollis | B63C 11/26 340/850 |
| 2009/0175599 A1* | 7/2009 | Grim, III | G11B 27/034 386/248 |
| 2009/0265172 A1* | 10/2009 | Tipton | G10L 13/00 704/260 |
| 2011/0029326 A1* | 2/2011 | Venon | G06Q 10/06 705/3 |
| 2011/0157046 A1* | 6/2011 | Lee | G04G 21/08 348/173 |
| 2012/0060116 A1* | 3/2012 | Baldwin | G06F 21/10 715/810 |
| 2013/0117248 A1 | 5/2013 | Bhogal et al. | |
| 2014/0108010 A1* | 4/2014 | Maltseff | G06F 3/167 704/235 |
| 2014/0226953 A1* | 8/2014 | Hou | H04N 21/4325 386/230 |
| 2014/0255003 A1* | 9/2014 | Abramson | G06F 17/30247 386/240 |
| 2015/0163558 A1* | 6/2015 | Wheatley | H04N 21/6587 725/12 |
| 2015/0185964 A1* | 7/2015 | Stout | G06F 3/0481 715/716 |

OTHER PUBLICATIONS

Written Opinion dated Mar. 25, 2015 in International Patent Application No. PCT/US2014/072265.

\* cited by examiner

METHODS, SYSTEMS, AND MEDIA FOR REWINDING MEDIA CONTENT BASED ON DETECTED AUDIO EVENTS

TECHNICAL FIELD

The disclosed subject matter relates to methods, systems, and media for rewinding media content based on detected audio events. More particularly, the disclosed subject matter relates to detecting an audio event, such as an interruption that occurs during the playback of media content, in response to receiving a user request and automatically rewinding the media content based on the detected audio event.

BACKGROUND

When consuming media content, such as a television program, a user may be distracted by various sources, such as a telephone call, a doorbell ringing, another user speaking to the user consuming the media content, and other interruptions. To avoid missing a portion of the media content, the user may have to manually pause the playback of the media content immediately after being distracted by such an interruption. Alternatively, the user may have to manually rewind the media content to a playback position that precedes the occurrence of the interruption. This can, for example, create a disjointed experience for the user, where the user has to rewind the media content one or more times to locate a desired playback position to resume playback of the media content.

Accordingly, it is desirable to provide new mechanisms for rewinding media content based on detected audio events.

SUMMARY

Methods, systems, and media for rewinding media content based on detected audio events are provided.

In accordance with some embodiments of the disclosed subject matter, a method for providing media guidance is provided, the method comprising: causing, using a hardware processor, media content to be presented; receiving, using an audio input device, audio data that includes ambient sounds in an environment in which the media content is being presented; receiving a user command to rewind the media content; detecting that a portion of the audio data corresponds to an audio event that occurred during the presentation of the media content in response to receiving the user command to rewind the media content; determining a playback position in the media content based on the audio event; and causing the media content to be presented from the determined playback position.

In accordance with some embodiments of the disclosed subject matter, a system for providing media guidance is provided, the system comprising: an audio input device; a storage device; and at least one hardware processor that is configured to: cause media content to be presented; store audio data received using the audio input device in the storage device, wherein the audio data includes ambient sounds in an environment in which the media content is being presented; receive a user command to rewind the media content; detect that a portion of the audio data corresponds to an audio event that occurred during the presentation of the media content in response to receiving the user command to rewind the media content; determine a playback position in the media content based on the audio event; and cause the media content to be presented from the determined playback position.

In accordance with some embodiments of the disclosed subject matter, a non-transitory computer-readable medium containing computer-executable instructions that, when executed by a processor, cause the process to perform a method for presenting a media file, the method comprising: causing media content to be presented; receiving audio data that includes ambient sounds in an environment in which the media content is being presented; receiving a user command to rewind the media content; detecting that a portion of the audio data corresponds to an audio event that occurred during the presentation of the media content in response to receiving the user command to rewind the media content; determining a playback position in the media content based on the audio event; and causing the media content to be presented from the determined playback position.

In accordance with some embodiments of the disclosed subject matter, a system for providing media guidance is provided, the system comprising: means for causing media content to be presented; means for receiving audio data that includes ambient sounds in an environment in which the media content is being presented; means for receiving a user command to rewind the media content; means for detecting that a portion of the audio data corresponds to an audio event that occurred during the presentation of the media content in response to receiving the user command to rewind the media content; means for determining a playback position in the media content based on the audio event; and means for causing the media content to be presented from the determined playback position.

In some embodiments, the playback position corresponds to a time position in the media content prior to the occurrence of the audio event.

In some embodiments, the means for receiving the user command to rewind the media content further comprises means for identifying a voice input from the audio data that corresponds to a request to rewind the media content.

In some embodiments, the means for receiving the user command to rewind the media content further comprises means for detecting that the user command has been received from a remote control.

In some embodiments, the system further comprises: means for determining a plurality of absolute ambient noise levels in the audio data; means for comparing each of the plurality of absolute ambient noise levels with a predetermined threshold value; and means for detecting the audio event during the presentation of the media content based on the comparison.

In some embodiments, the system further comprises: means for detecting a type of audio event from the audio data; and means for determining the playback position based on the type of audio event.

In some embodiments, the media content includes an audio portion and the system further comprises: means for calculating a plurality of relative ambient noise levels in the audio data based on the audio portion; and means for detecting the audio event that occurred during the presentation of the media content based on the plurality of relative ambient noise levels.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
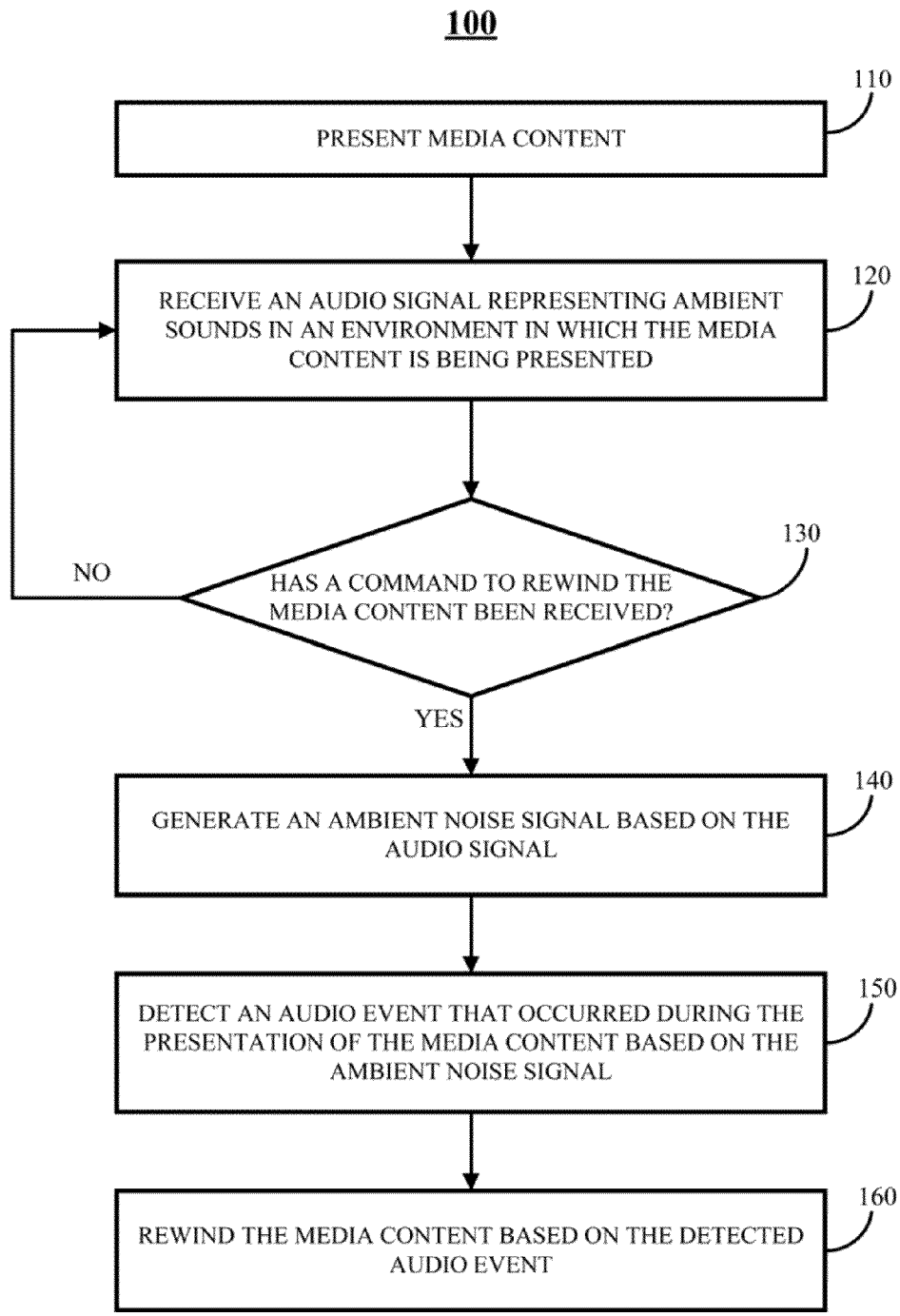
FIG. 1 is a block diagram of an illustrative process for rewinding media content based on detected audio events in accordance with some embodiments of the disclosed subject matter.

In accordance with various embodiments, mechanisms (which can include methods, systems, and/or media) for rewinding media content based on detected audio events are provided.

In some embodiments, the mechanisms described herein can monitor audio signals that include ambient or background sounds for audio events during the presentation of media content. For example, the mechanisms can receive an audio signal that includes ambient sounds in an environment (e.g., a living room environment) in which the media content is being presented. In a more particular example, a microphone can be situated in the environment to receive audio data that includes ambient sounds when the media content is being presented. The mechanisms can then convert the ambient sounds into an audio signal (e.g., using the microphone or a hardware processor).

It should be noted that, prior to receiving audio signals or any other audio data using an audio input device, these mechanisms can provide the user with an opportunity to provide a consent or authorization to perform actions, such as activating an audio input device and transmitting audio data. For example, upon loading an application on a computing device, such as a television device or a media playback device, the application can prompt the user to provide authorization for activating an audio input device, transmitting audio data, detecting events in the audio data, and/or rewinding media content based on the detected events. In a more particular example, in response to downloading the application and loading the application on a media playback device, the user can be prompted with a message that requests (or requires) that the user provide consent prior to performing these actions. Additionally or alternatively, in response to installing the application, the user can be prompted with a permission message that requests (or requires) that the user provide content prior to performing these detections and/or transmitting information relating to these detections. In the instance where the user consents to the use of such data, audio data from an audio input device can be received and one or more audio events (e.g., interruption points) can be detected.

In some embodiments, the mechanisms can receive a user command to rewind the media content to a playback position prior to the occurrence of a detected audio event (e.g., a detected interruption). For example, an audio event can be detected and the media content can be presented at a playback position prior to the occurrence of the detected audio event in response to receiving a voice command issued by a user through an audio input device (e.g., a voice input of "rewind" from the user). In another example, an audio event can be detected and the media content can be presented at a playback position prior to the occurrence of the detected audio event in response to the user selecting a rewind button on a remote control, a mobile phone, a tablet computing device, a wearable computing device, etc. The detection of audio events (e.g., interruptions that occurred during the presentation of the media content) can be triggered by the receipt of the user command.

In some embodiments, in response to receiving a user command to rewind the media content, the mechanisms can detect an audio event that occurred during the presentation of the media content based on the audio signal received from the audio input device. For example, the mechanisms can calculate absolute ambient volume levels within the audio signal. The mechanisms can then detect an audio event that occurred during the presentation of the media content by determining that at least one of the absolute ambient volume levels exceeds a predetermined threshold value. As another example, the mechanisms can calculate one or more relative ambient volume levels within the audio signal (e.g., an amount of change between two absolute ambient volume levels, a rate of change corresponding to multiple absolute ambient volume levels, an amount of change between an absolute ambient volume level and an average ambient volume level, etc.). The mechanisms can then detect an audio event that occurred during the presentation of the media content by determining that at least one of the relative ambient volume levels exceeds a predetermined threshold value. As yet another example, the mechanisms can detect an audio event that occurred during the presentation of the media content by identifying a particular type of ambient sound within the audio signal, such as a human voice, a telephone call, etc.

Upon detecting an audio event that occurred during the presentation of the media content, the mechanisms can cause the media content to be presented from a particular playback position prior to the occurrence of the audio event. For example, in response to receiving the user command to rewind the media content and detecting an audio event, the mechanisms can automatically rewind the media content to a position that is a particular number of seconds prior to the detected audio event.

Alternatively, in some embodiments, the detection of audio events (e.g., interruptions that occurred during the presentation of the media content) can be performed during the presentation of the media content, where playback positions can be assigned along the timeline of the media content. In response to receiving a user command to rewind the media content, such as a voice command of "Rewind—I was interrupted," the user command can trigger the mechanisms to cause the media content to be presented from a playback position prior to the occurrence of the detected audio event.

These and other features for rewinding media content based on detected audio events are described herein in connection with FIGS. 1-4.

Turning to FIG. 1, a flow chart of an illustrative process 100 for rewinding media content based on detected audio events in accordance with some embodiments of the disclosed subject matter is shown.

Figure 2:
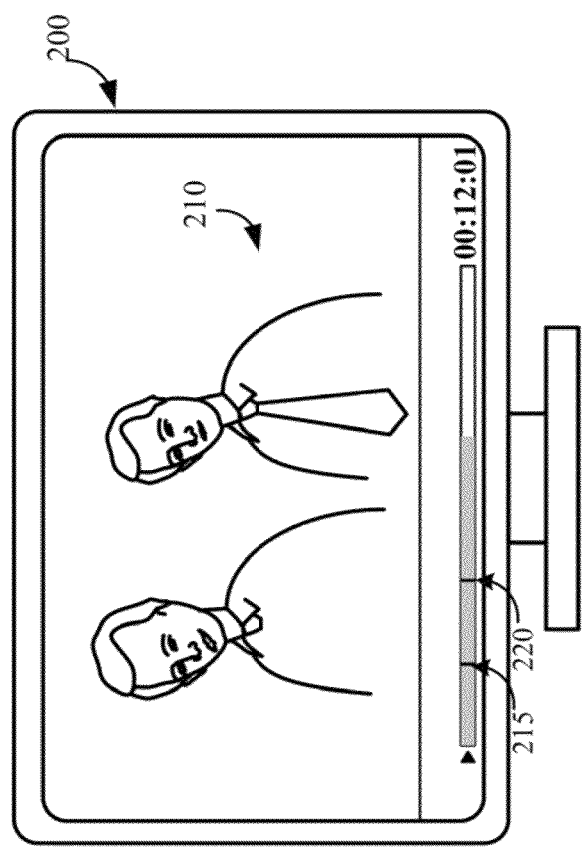
FIG. 2 shows an example of an illustrative display screen for presenting media content and rewinding the media content based on detected audio events in accordance with some embodiments of the disclosed subject matter.

As illustrated, process 100 can begin by presenting media content at 110. The presented media content can be any suitable content, such as video content, audio content, television programs, movies, cartoons, music, sound effects, audiobooks, streaming live content (e.g., a streaming radio show, a live concert, etc.), etc. For example, as shown in FIG. 2, a hardware processor can cause media content 210 to be presented on a display 200.

In some embodiments, media content can be presented using any suitable media playback device, such as a streaming media playback device, a media center computer, a DVD recorder, a BLU-RAY player, a digital video recorder, a television device, a tablet computing device, a laptop, a desktop, a mobile phone, a game console, a CD player, an MP3 player, an electronic book reader, or any other suitable media device.

At 120, process 100 can receive an audio signal that includes ambient sounds in an environment in which the media content is being presented. The audio signal can be generated using any suitable audio input device, such as a microphone or a sound level meter. For example, a microphone can be positioned in the environment in which the media content is being presented to receive and/or record ambient sounds in the environment (e.g., a living room environment). In another example, the microphone or other audio input device can be integrated with a media playback device and/or a mobile device, such as a built-in microphone of a game console, a mobile phone, a tablet computing device, or a television device.

It should be noted that, prior to receiving audio signals or any other audio data using an audio input device, process 100 can provide the user with an opportunity to provide a consent or authorization to perform actions, such as activating an audio input device and transmitting audio data. For example, upon loading an application on a computing device, such as a television device or a media playback device, the application can prompt the user to provide authorization for activating an audio input device, transmitting audio data, detecting events in the audio data, and/or rewinding media content based on the detected events. In a more particular example, in response to downloading the application and loading the application on a media playback device or a mobile device, the user can be prompted with a message that requests (or requires) that the user provide consent prior to performing these actions. Additionally or alternatively, in response to installing the application, the user can be prompted with a permission message that requests (or requires) that the user provide content prior to performing these detections and/or transmitting information relating to these detections.

In some embodiments, process 100 can then convert the ambient sounds into an audio signal (e.g., using the audio input device or a hardware processor). For example, a media playback device or any other suitable device connected to the audio input device can temporarily store the audio data and/or the audio signal in a circular buffer (e.g., implemented in volatile memory that will be overwritten when new audio data or audio signals are received). In a more particular example, the circular buffer can be used to temporarily store audio data corresponding to a predetermined amount of audio data (e.g., thirty seconds, one minute, ten minutes, thirty minutes, etc.) and the oldest audio data can be continually overwritten with newly recorded audio data. It should be noted that, in some embodiments in which the media content is presented using one or more speakers, a component of the audio signal can correspond to the audio portion of the media content being presented.

In some embodiments, process 100 can store the received audio signal in any suitable manner. For example, process 100 can store a portion of the audio signal in a temporary manner. In a more particular example, a segment of the audio signal corresponding to a given time interval, or a given frequency band can be stored in a buffer for a period of time (e.g., a few seconds, a few minutes, or any other suitable period of time). In some embodiments, the period of time that audio data is stored in the buffer can be specified by the user (e.g., when initiating the application). As another example, process 100 can extract one or more features of the audio signal (e.g., by calculating one or more peaks, amplitudes, power levels, frequencies, signal to noise ratios, and/or other suitable features of the audio signal) and store the extracted features in a suitable storage device.

In some embodiments, process 100 can generate one or more audio fingerprints that can represent the audio signal or one or more suitable portions of the audio signal. The audio fingerprints can be digital representations generated from the received audio signal, where the audio fingerprints can be used to identify the same or similar portions of the audio signal (e.g., a portion of the audio signal corresponding to the media content, a portion of the audio signal corresponding to one or more interruptions that occurred during the presentation of media content, etc.). In some embodiments, the audio fingerprints can be generated using any suitable audio fingerprinting algorithms, which may include one or more suitable two-dimensional transforms (e.g., a discrete cosine transform), three-dimensional transforms (e.g., a wavelet transform), hash functions, etc. The audio fingerprints can then be stored in a suitable storage device.

At 130, process 100 can determine whether a user command to rewind the media content has been received. In some embodiments, the user command to rewind the media file can correspond to one or more user inputs. For example, the user command can correspond to a voice command indicative of a user's desire to rewind the media file. In a more particular example, a voice command of "rewind" can be provided by the user consuming the media content and detected by a microphone connected to a media playback device and/or a mobile device. As another example, a hardware processor can determine that a user command to rewind the media content has been received in response to the user selecting a rewind button using a mobile device, such as a remote control, a mobile phone, a tablet computer, etc. It should be noted that, in some embodiments, the user command to rewind the media content can be transmitted in any suitable form, such as one or more infrared signals, High-Definition Multimedia Interface (HDMI) Communication Channel Protocols (CEC) commands, WiFi signals, and/or other suitable control signals.

In some embodiments, in response to determining that a user command to rewind the media content has not been received, process 100 can return back to step 120.

At 140, in response to determining that a user command to rewind the media content has been received, process 100 can generate an ambient noise signal based on the audio signal or audio data. For example, in some embodiments in which the media content is presented using one or more speakers, process 100 can generate an ambient noise signal by subtracting or removing the audio portion representative of the media content being presented from the audio signal received at 120. In a more particular example, the audio signal representative of the media content can be generated by a microphone monitoring the media content being presented by the media playback device. In some embodiments, two microphones can be used to monitor the ambient sounds in the environment and the media content being presented by the media playback device, respectively. Additionally or alternatively, the audio portion representative of the audio data corresponding to the presented media content can be generated based on a media file containing the media content.

In some embodiments, process 100 can use the audio signal received at 120 as the ambient noise signal when it determines that the media content is not being presented using one or more speakers.

Additionally or alternatively, process 100 can process the audio signal and/or the ambient noise signal using one or more suitable signal processing algorithms to generate an ambient noise signal. In a more particular example, process 100 can convert an analog audio signal into a digital audio signal using a suitable analog to digital converter. In another more particular example, process 100 can convert the audio signal or the ambient noise signal into a frequency-domain signal (e.g., by performing a fast Fourier transform, etc.). In yet another more particular example, process 100 can apply one or more of a low-pass filter, a band-pass filter, etc. to the audio signal and/or the ambient noise signal.

Next, at 150, process 100 can detect an audio event that occurred during the presentation of media content based on the ambient noise signal. Illustrative examples of an audio event that can occur during the presentation of the media content can include a telephone ringing, noise greater than a threshold value, music, a human voice, or any other suitable interruptions that can interfere with the playback of the media content.

In some embodiments, process 100 can process the ambient noise signal or a portion of the ambient noise signal (e.g., a segment of the ambient noise signal corresponding to a particular duration, a particular frequency band, etc.) using suitable signal processing algorithms. Process 100 can then detecting an audio event based on the processed ambient noise signal.

For example, process 100 can calculate one or more absolute ambient noise levels based on the ambient noise signal. Process 100 can then detect the occurrence of an audio event by locating an absolute ambient noise level that exceeds a predetermined threshold. In a more particular example, process 100 can calculate one or more suitable features of the ambient noise signal, such as peaks, amplitudes, power levels, etc. Process 100 can then compare the features with the predetermined threshold (e.g., by applying a suitable filter) and detect the occurrence of the audio event based on the comparison.

As another example, process 100 can calculate one or more relative ambient noise levels and detect the occurrence of an audio event based on the relative ambient noise levels. More particularly, for example, process 100 can calculate an amount of change (e.g., in decibels) between two absolute ambient noise levels corresponding to different times, a rate of change corresponding to multiple absolute ambient noise levels, etc. Process 100 can then detect the occurrence of the audio event by locating a relative ambient noise level that exceeds a predetermined threshold.

As yet another example, process 100 can locate the occurrence of an audio event during the presentation of the media content by detecting a particular type of ambient noise. In some embodiments, the particular type of ambient noise can be predefined by a user and/or suitable settings. In a more particular example, process 100 can detect an incoming call as an audio event that occurred during the presentation of the media content. In another more particular example, process 100 can detect the presence of human voice or speech contained in the ambient noise signal using suitable speech detection algorithms (e.g., by analyzing one or more frequency components of the ambient noise signal). It should be noted that the presence of human voice or speech can be detected without recognizing the content of the speech.

As a further example, process 100 can locate the occurrence of an audio event during the presentation of the media content by comparing the audio fingerprint(s) associated with the received audio signal to multiple audio fingerprints. In a more particular example, process 100 can access a database or other suitable storage device containing multiple audio fingerprints and search for audio fingerprints representing one or more audio events (e.g., interruption points) that are the same or substantially similar to the audio fingerprints associated with the received audio signal. In another more particular example, the audio fingerprint(s) associated with the received audio signal can be compared against a set of audio fingerprints representing the media content that is being presented.

In some embodiments, upon identifying one or more audio events that occurred during the presentation of the media content and/or the type(s) of the audio events, the media content can be labeled based on the detected audio events. For example, a detected event or audio event can be associated with a description of the audio event, a time position in the media content corresponding to the audio event, and/or other suitable information relating to the detected audio event. Multiple detected audio events can then be indexed and/or stored based on the associated information.

In a more particular example, as shown in FIG. 2, when media content is being presented on a media playback device 200, one or more audio events can be detected during the presentation of the media content as described above. In some embodiments, the detected audio events can include a first event (e.g., a telephone ringing) occurring at a time 215 during the presentation of the media content and a second event (e.g., a speaking event) occurring at a time 220 during the presentation of the media content. The first event and the second event can be associated with time 215 and time 220, respectively. Additionally or alternatively, a description can be associated with each of the first event and the second event (e.g., a telephone call, a conversation, etc.) and can be stored with its corresponding time during the presentation of the media content in a suitable storage device. In such an example, audio data representing the audio signal and/or the ambient audio signal does not have to be stored to rewind and/or represent the media content based on the detected events.

In some embodiments, process 100 can include transmitting a portion of audio data corresponding to a detected audio event to a detection service (e.g., an audio search engine, an audio detection service, etc.). In response to receiving the portion of audio data, the detection service can determine a corresponding type of audio event, such as a telephone ringing, a human voice speaking, a dog barking, an alarm ringing, etc. For example, each different type of audio event can have an associated playback position (e.g., a playback position of thirty seconds prior to the detection of any type of telephone ringing, a playback position of one minute prior to the detection of any type of human speech, etc.).

In some embodiments, upon detecting multiple audio events during the presentation of the media content, one or more suitable user interfaces can be presented to the user to inform the user about the detected events. For example, a hardware processor can provide an indication on display 200 that indicates to the user: "An interruption has been detected. Do you want to rewind the video before this interruption occurred? Say 'rewind' now." In another example, a hardware processor can provide an icon or indicator on display 210 that indicates to the user that a rewind option to automatically rewind prior to the occurrence of the detected audio event is available. Additionally or alternatively, the user may be prompted to select a detected event corresponding to a desired rewinding point (e.g., by issuing a voice command corresponding to the detected event).

In some embodiments, process 100 can include prompting the user to indicate which types of audio events the user considers as interruptions. For example, the user can be provided with a suitable interface to indicate that background conversations below a given threshold noise level are not considered interruptions, while ringing or alerts from a mobile device are always considered interruptions. In another example, in response to providing the user with multiple opportunities to automatically rewind the media content upon detecting a speech interruption and detecting that the user has not provided a user command to rewind the media content, process 100 can determine that such interruptions can be ignored for additional detections of audio events in audio data.

At 160, process 100 can rewind the media content based on the detected audio event. In some embodiments, process 100 can determine a playback position in the media content based on the occurrence of the audio event. For example, process 100 can designate a playback position that is the particular time corresponding to the start of the detected audio event (e.g., from when the phone ringing event was detected). In another example, process 100 can automatically designate a playback position that is a particular period of time prior to the detected audio event (e.g., five seconds prior to the detected audio event). In another example, process 100 can determine a user-designated preference for assigning a playback position. In a more particular example, the user when setting up the client application can be requested to input a time interval for assigning playback positions in response to a detected audio event (e.g., always thirty seconds prior to the detected audio event). In yet another example, process 100 can detect a scene change in the media content that precedes the time instant corresponding to the occurrence of the detected audio event. Process 100 can then cause the media content to be presented from the detected scene change.

In a more particular example, playback positions can be generated and associated with a detected audio event. The user may be consuming media content on a media playback device and, during the playback of the media content, another user may begin talking to the user. As the users talk, an audio input device connected to the media playback device can receive the audio of the users' conversation and detect an event (e.g., an audio event). The media playback device executing the application can determine that the audio event is a speaking audio event and generate a playback position associated with the time during the presentation of the media content that the event was detected (e.g., five seconds prior to the speaking audio event detected at the fifty-five second mark of the media content). In some embodiments, after these playback positions are generated, the audio data that was used to detect the audio event and generate the playback position can be disconnected. For example, after a playback position has been generated, it is no longer associated with audio data (e.g., words or phrases uttered by a user), but is instead only associated with one or more detected audio events. This can allow for a rewind point to be determined without a risk that the conversation between users or other audio data is being recorded. This can assuage privacy concerns that users may have concerning a device recording their conversations.

Process 100 can then rewind the media content to the playback position and cause the media content to be presented to the user from the playback position.

It should be noted that the above steps of the flow diagram of FIG. 1 can be executed or performed in any order or sequence not limited to the order and sequence shown and described in the figure. Also, some of the above steps of the flow diagram of FIG. 1 can be executed or performed substantially simultaneously where appropriate or in parallel to reduce latency and processing times. Furthermore, it should be noted that FIG. 1 is provided as examples only. At least some of the steps shown in these figures may be performed in a different order than represented, performed concurrently, or altogether omitted.

For example, in some embodiments, process 100 can generate an ambient noise signal based on the audio signal or audio data and can detect an audio event prior to receiving a user command, such as voice command. In some embodiments, audio data can be continually stored in a circular buffer or any other suitable storage device and an ambient noise signal based on the audio data stored in the circular buffer can be generated and analyzed to determine whether an audio event is present. In response to receiving a user command, such as a voice command to rewind, process 100 can rewind the presentation of the media content to a playback position prior to the detected audio event. Additionally, in response to receiving a subsequent user comment to rewind the media content, process 100 can rewind the presentation of the media content to a playback position prior to the previously detected audio event.

Figure 3:
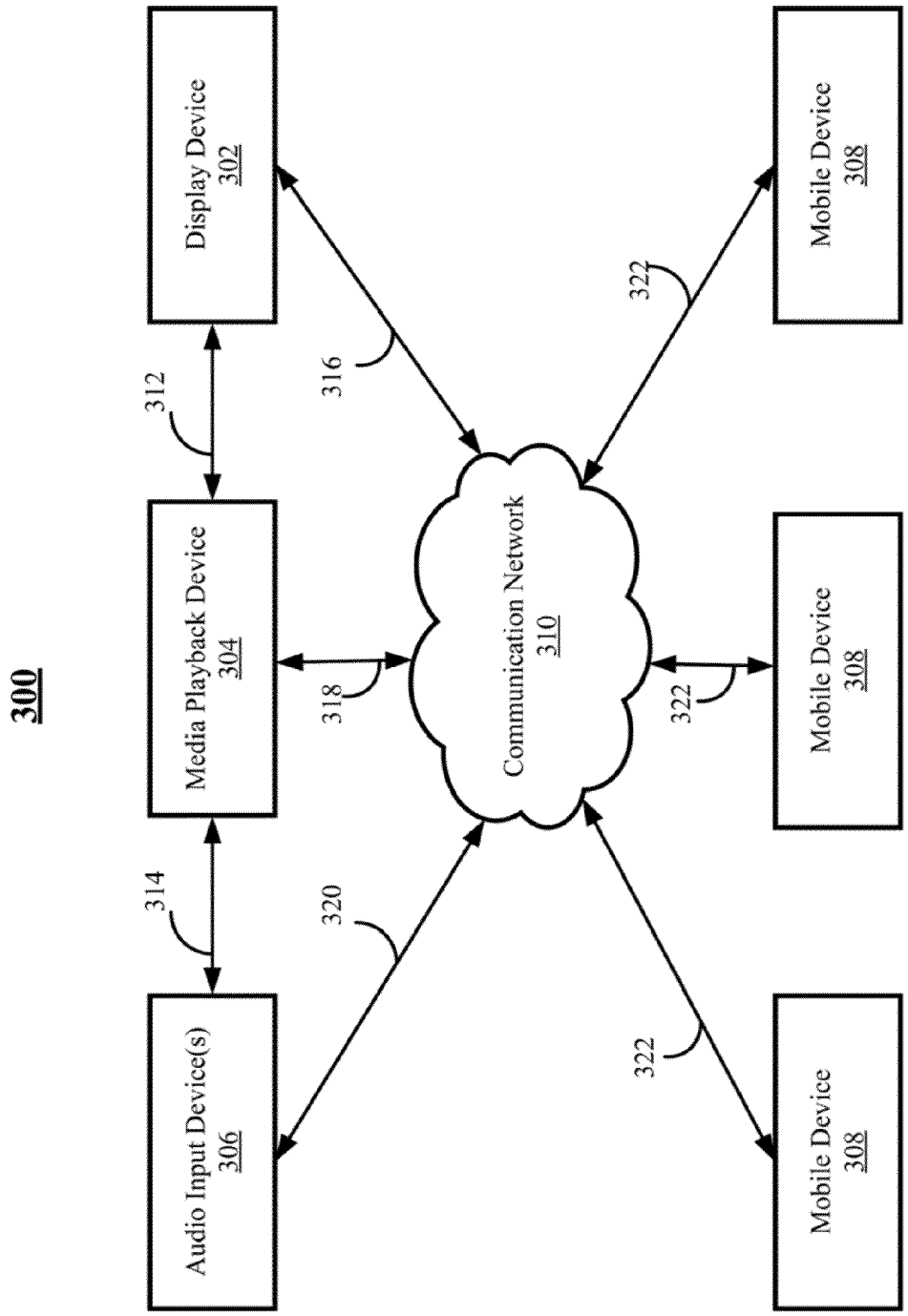
FIG. 3 is a block diagram of an illustrative system suitable for implementation of the mechanisms described herein for rewinding media content based on detected audio events in accordance with some embodiments of the disclosed subject matter.

Turning to FIG. 3, an example 300 of a system for rewinding media content based on detected events in accordance with some embodiments of the disclosed subject matter is shown. As illustrated, system 300 can include a display device 302, a media playback device 304, one or more audio input devices 306, one or more mobile devices 308, a communication network 310, and communication links 312, 314, 316, 318, 320, and 322.

In some embodiments, one or more portions of, or all of, process 100 as illustrated in FIG. 1 can be implemented by one or more of display device 302, media playback device 304, audio input device(s) 306, and mobile device(s) 308. For example, one or more of media playback device 304 and/or mobile device(s) 308 may detect one or more audio events during the presentation of media content based on audio data generated by audio input device(s) 302 and calculate one or more rewind points based on the detected audio events. Alternatively or additionally, the audio data or a suitable portion of the audio data can be transmitted to a suitable service for analysis. In a more particular example, the audio data can be transmitted to a search system that accesses a matching service (e.g., an audio fingerprint match service). The search system can then generate one or more suitable audio fingerprints of the audio data and/or search for stored reference audio fingerprints that match the generated audio fingerprints.

Display device 302 can be any suitable device that is capable of receiving, converting, processing, and/or presenting media content, such as a streaming media playback device, a media center computer, a CRT display, a LCD, a LED display, a plasma display, a touch-screen display, a simulated touch screen, a television device, a mobile phone, etc. In some embodiments, display device 302 can present the user with three-dimensional content.

Media playback device 304 can be any suitable device that is capable of presenting media content, receiving and processing controls signals indicative of requests for rewinding media content, processing audio signals, and/or performing any other suitable functions. Examples of streaming media devices include a streaming media playback device, a media center computer, a DVD recorder, a BLU-RAY player, a digital video recorder, a television device, a tablet computing device, a laptop, a desktop, a mobile phone, a game console, a CD player, a MP3 player, an electronic book reader, a set-top box, etc. In some embodiments, the media content can include any suitable content, such as audio content, video content, multimedia content, etc. In some embodiments, the media content can have any suitable format, such as MP3, WMA, WMV, OCD, MPEG-DST, AVI, MOV, etc.

Mobile device(s) 308 can be any suitable device that is capable of receiving and/or processing user inputs, generating and transmitting control signals based on the received user inputs, and/or performing any other suitable functions. For example, mobile device(s) 308 can include a remote control, a mobile phone, a tablet computer, a laptop computer, a desktop computer, a personal data assistant (PDA), a portable email device, a voice recognition system, a gesture recognition system, a keyboard, a mouse, a microphone, etc. In some embodiments, mobile device(s) 208 can receive suitable user inputs indicative of a user's desire to rewind media content. For example, the user inputs can include one or more voice commands issued by the user using a microphone. As another example, the user inputs can include a user selecting a rewind button using a mobile device (e.g., by pressing and/or releasing one or more buttons of a remote control, selecting one or more suitable buttons on a user interface displayed on mobile device(s) 308 or display device 302.

Although three mobile devices 308 are shown in FIG. 3 to avoid over-complicating the drawing, any suitable number of these devices, and any suitable types of these devices, can be used in some embodiments.

Audio input device(s) 306 can be any suitable device that is capable of receiving acoustic input from a user, gathering audio data about ambient noise, generating audio signals, processing audio signals, and/or performing other suitable functions. Examples of audio input devices can include microphones, sound level meters, etc. In some embodiments, audio input device(s) 310 can be integrated with or connected to mobile device(s) 308, display device 302, media playback device 304, etc. In some embodiments, audio input device(s) 306 can include an external microphone (e.g., a microphone in an accessory such as a wired or wireless headset).

In some embodiments, each of display device 302, media playback device 304, and mobile device(s) 308 can be any of a general purpose device, such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, a storage device (which can include a hard drive, a digital video recorder, a solid state storage device, a removable storage device, or any other suitable storage device), etc.

In some embodiments, media playback device 304 can be connected to display device 302 and audio input device(s) 306 through communication links 312 and 314, respectively. In some embodiments, each of display device 302, media playback device 304, audio input device(s) 306, and mobile device(s) 308 can be connected to communication network 310 through communication links 316, 318, 320, and 322, respectively. Communication links 312, 314, 316, 318, and 320 can be any suitable communication links, such as network links, dial-up links, wireless links, hard-wired links, any other suitable communication links, or a combination of such links. In some embodiments, each of communication links 312, 314, 316, 318, 320, and 322 can include one or more infrared (IR) communication links, High-Definition Multimedia Interface (HDMI) links, local area network (LAN) links, etc.

Communication network 310 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a cable television network, a fiber optic network, a telephone network, a satellite network, or any combination of any of such networks.

In some embodiments, each of display device 302, media playback device 304, audio input device(s) 306, and mobile device(s) 308 can be implemented as a stand-alone device or integrated with other components of system 300.

For example, a rewinding application executing on a computing device can include a second screen application or can communicate with a second screen application that has been installed on a mobile device (e.g., a mobile phone, a tablet computing device, a wearable computing device, etc.). The second screen application can, for example, allow the user of the mobile device or other second screen device to be presented with content transmitted to a media playback device, such as a television device, a set-top box, a game console, etc. In some embodiments, the rewinding application can use the second screen application to rewind media content based on detected events. In some embodiments, the second screen application can be used to activate an audio input device on a second screen device and the audio data detected by the audio input device can be processed by the second screen device and/or the media playback device.

Figure 4:
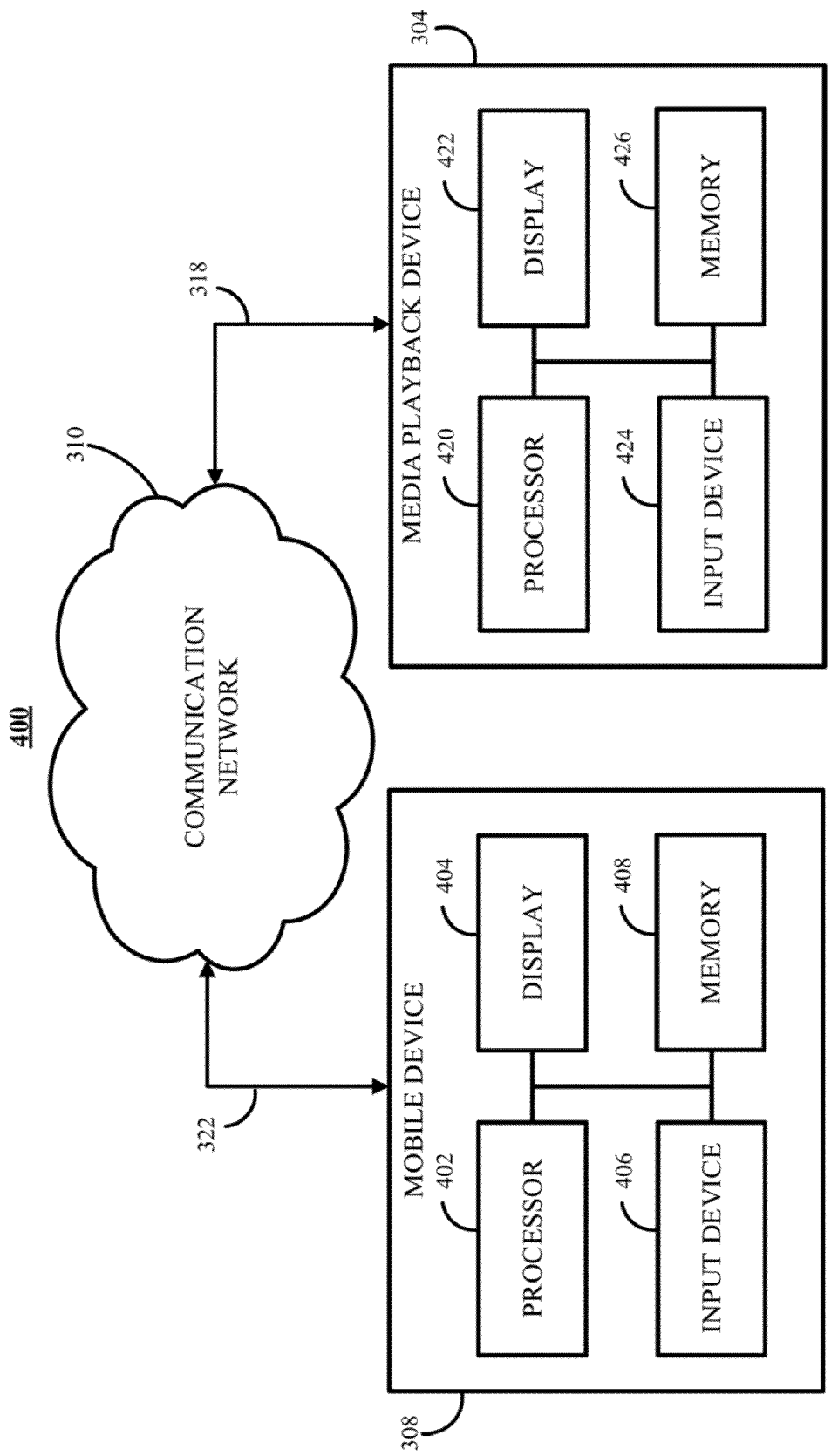
FIG. 4 shows a detailed example of a media playback device and one of the mobile devices of FIG. 3 that can be used in accordance with some embodiments of the disclosed subject matter.

The media playback device and one of the mobile devices depicted in FIG. 3 are illustrated in more detail in FIG. 4. Referring to FIG. 4, mobile device 308 may include a hardware processor 402, a display 404, an input device 406, and memory 408, which may be interconnected. Iren some embodiments, memory 408 can include a storage device (such as a non-transitive computer-readable medium) for storing a computer program for controlling hardware processor 402, audio data, user inputs, and/or other suitable information.

Processor 402 uses the computer program to present on display 404 media content, user interfaces, data received through communication link 308, and commands and values transmitted by a user of mobile device 308. It should also be noted that data received through communication link 322 or any other communication links may be received from any suitable source. In some embodiments, hardware processor 402 can send and receive data through communication link 322 or any other communication links using, for example, a transmitter, receiver, transmitter/receiver, transceiver, or any other suitable communication device. Input device 406 may be a computer keyboard, a mouse, a keypad, a cursor-controller, a gesture system, a remote control, or any other suitable input device as would be used by a designer of input systems or process control systems. Alternatively, input device 406 may be a finger-sensitive or stylus-sensitive touch screen input of display 404. For receiving the voice commands described above, input device 406 may be a microphone.

Media playback device 304 may include processor 420, display 422, input device 424, and memory 426, which may be interconnected. In a preferred embodiment, memory 426 contains a storage device for storing data received through communication link 318 or through other links, and also receives commands and values transmitted by one or more users. The storage device further contains a server program for controlling processor 320.

In some embodiments, the application may include an application program interface (not shown), or alternatively, the application may be resident in the memory of mobile device 208 or media playback device 304. In another suitable embodiment, the only distribution to mobile device 308 may be a graphical user interface ("GUI") which allows a user to interact with the application resident at, for example, media playback device 304.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that in implementations described herein in which the application (or other mechanisms described herein) collects information about a particular user, the user can be provided with an opportunity to control whether the collects information about particular users and/or how collected user information is used by the application. Examples of information about a user can include the user's interests, a user's location, names spoken by the user, etc. Additionally, certain information about the user can be stored locally (e.g., not shared), encrypted, and/or treated in one or more ways before it is stored to remove personally identifiable information. For example, a user's identity can be treated such that no personally identifiable information can be determined for the user. As another example, a user's geographic location can be generalized where location information is obtained (e.g., to a city level, a ZIP code level, a state level, etc.), so that a particular location of a user cannot be determined. Using these techniques and others described herein, the user can have control over what information is collected about the user and/or how that information is used by the topic determination application (or other mechanisms).

Accordingly, methods, systems, and media for rewinding media content based on detected audio events are provided.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative embodiments, it is understood that the present disclosure has been made only by way of example, and that numerous changes in the details of embodiments of the disclosed subject matter can be made without departing from the spirit and scope of the disclosed subject matter, which is limited only by the claims that follow. Features of the disclosed embodiments can be combined and rearranged in various ways.

What is claimed is:

1. A method for providing media guidance, the method comprising:
   causing, using a hardware processor, media content to be presented;
   receiving, using an audio input device, audio data that includes ambient sounds in an environment in which the media content is being presented; receiving a user command to rewind the media content; detecting that a portion of the audio data corresponds to an audio event that occurred during the presentation of the media content in response to receiving the user command to rewind the media content;
   determining a playback position in the media content based on the audio event; and
   causing the media content to be presented from the determined playback position,
   wherein receiving the user command to rewind the media content further comprises identifying a voice input from the audio data that corresponds to a request to rewind the media content,
   wherein the method further comprising:
   detecting a type of audio event from the audio data; and
   determining the playback position based on the type of audio event.

2. The method of claim 1, wherein the playback position corresponds to a time position in the media content prior to the occurrence of the audio event.

3. The method of claim 1, wherein receiving the user command to rewind the media content further comprises detecting that the user command has been received from a remote control.

4. The method of claim 1, further comprising:
   determining a plurality of absolute ambient noise levels in the audio data;
   comparing each of the plurality of absolute ambient noise levels with a predetermined threshold value; and
   detecting the audio event during the presentation of the media content based on the comparison.

5. The method of claim 1, wherein the media content includes an audio portion and wherein the method further comprises:
   calculating a plurality of relative ambient noise levels in the audio data based on the audio portion; and
   detecting the audio event during the presentation of the media content based on the plurality of relative ambient noise levels.

6. A system for providing media guidance is provided, the system comprising:
   an audio input device;
   a storage device; and
   at least one hardware processor that is configured to:
   cause media content to be presented;
   store audio data received using the audio input device in the storage device,
   wherein the audio data includes ambient sounds in an environment in which the media content is being presented;
   receive a user command to rewind the media content;
   detect that a portion of the audio data corresponds to an audio event that occurred during the presentation of the media content in response to receiving the user command to rewind the media content;
   determine a playback position in the media content based on the audio event; and
   cause the media content to be presented from the determined playback position,
   wherein the hardware processor is further configured to:
   identify a voice input from the audio data that corresponds to a request to rewind the media content;
   detect a type of audio event from the audio data; and
   determine the playback position based on the type of audio event.

7. The system of claim 6, wherein the playback position corresponds to a time position in the media content prior to the occurrence of the audio event.

8. The system of claim 6, wherein the hardware processor is further configured to detect that the user command has been received from a remote control.

9. The system of claim 6, wherein the hardware processor is further configured to:
   determine a plurality of absolute ambient noise levels in the audio data;
   compare each of the plurality of absolute ambient noise levels with a predetermined threshold value; and
   detect the audio event during the presentation of the media content based on the comparison.

10. The system of claim 6, wherein the media content includes an audio portion and wherein the hardware processor is further configured to:
    calculate a plurality of relative ambient noise levels in the audio data based on the audio portion; and
    detect the audio event during the presentation of the media content based on the plurality of relative ambient noise levels.

11. A non-transitory computer-readable medium containing computer-executable instructions that, when executed by a processor, cause the processor to perform a method for presenting a media file, the method comprising:
    causing media content to be presented;
    receiving audio data that includes ambient sounds in an environment in which the media content is being presented;
    receiving a user command to rewind the media content;
    detecting that a portion of the audio data corresponds to an audio event that occurred during the presentation of the media content in response to receiving the user command to rewind the media content;
    determining a playback position in the media content based on the audio event; and
    causing the media content to be presented from the determined playback position,
    wherein the method further comprises identifying a voice input from the audio data that corresponds to a request to rewind the media content;
    detecting a type of audio event from the audio data; and
    determining the playback position based on the type of audio event.

12. The non-transitory computer-readable medium of claim 11, wherein the playback position corresponds to a time position in the media content prior to the occurrence of the audio event.

13. The non-transitory computer-readable medium of claim 11, wherein the method further comprises detecting that the user command has been received from a remote control.

14. The non-transitory computer-readable medium of claim 11, wherein the method further comprises:
    determining a plurality of absolute ambient noise levels in the audio data;
    comparing each of the plurality of absolute ambient noise levels with a predetermined threshold value; and detecting the audio event during the presentation of the media content based on the comparison.

15. The non-transitory computer-readable medium of claim 11, wherein the media content includes an audio portion and wherein the method further comprises:
    calculating a plurality of relative ambient noise levels in the audio data based on the audio portion; and
    detecting the audio event during the presentation of the media content based on the plurality of relative ambient noise levels.

* * * * *